United States Patent
Chung et al.

(10) Patent No.: US 12,406,806 B2
(45) Date of Patent: Sep. 2, 2025

(54) BROADBAND CAPACITOR

(71) Applicant: AMOTECH CO., LTD., Incheon (KR)

(72) Inventors: Yeonsoo Chung, Incheon (KR); Seungchul Lee, Incheon (KR); Soomin Oh, Incheon (KR); Jungsoo Lee, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 136 days.

(21) Appl. No.: 17/927,891

(22) PCT Filed: May 24, 2021

(86) PCT No.: PCT/KR2021/006410
§ 371 (c)(1),
(2) Date: Nov. 27, 2022

(87) PCT Pub. No.: WO2021/241957
PCT Pub. Date: Dec. 2, 2021

(65) Prior Publication Data
US 2023/0207193 A1    Jun. 29, 2023

(30) Foreign Application Priority Data

May 27, 2020    (KR) .................. 10-2020-0063903

(51) Int. Cl.
*H01G 4/005* (2006.01)
*H01G 4/232* (2006.01)
(Continued)

(52) U.S. Cl.
CPC ............. *H01G 4/005* (2013.01); *H01G 4/232* (2013.01); *H01G 4/248* (2013.01); *H01G 4/30* (2013.01)

(58) Field of Classification Search
CPC ........ H01G 4/005; H01G 4/232; H01G 4/248; H01G 4/30
(Continued)

(56) References Cited

U.S. PATENT DOCUMENTS 6,816,356 B2 * 11/2004 Devoe ................. H01G 4/38
361/309
8,125,760 B2    2/2012 Togashi
(Continued)

FOREIGN PATENT DOCUMENTS

JP    2010-045372 A    2/2010
KR    10-1079569 B1    11/2011
(Continued)

OTHER PUBLICATIONS

KR Office Action dated Jul. 7, 2022 as received in Application No. 10-2020-0063903.

*Primary Examiner* — Arun Ramaswamy
(74) *Attorney, Agent, or Firm* — Maschoff Brennan (57) ABSTRACT

Disclosed is a broadband capacitor in which floating electrodes are disposed above, below and at both sides of a stack in which a plurality of inner electrodes are stacked. The disclosed broadband capacitor comprises: a dielectric on which the stack having the plurality of inner electrodes stacked therein is disposed; a first outer electrode disposed at a first side surface of the dielectric; a second outer electrode disposed at a second side surface of the dielectric; a first floating electrode disposed above the stack; a second floating electrode disposed below the stack; a third floating electrode disposed at one side of the stack; and a fourth floating electrode disposed at the other side of the stack, opposite to the one side of the stack.

10 Claims, 5 Drawing Sheets

(51) Int. Cl.
*H01G 4/248* (2006.01)
*H01G 4/30* (2006.01)

(58) Field of Classification Search
USPC .................. 361/301.4, 303, 321.1, 321.3
See application file for complete search history.

(56) References Cited

U.S. PATENT DOCUMENTS

| | | | |
|---|---|---|---|
| 9,793,051 | B2 | 10/2017 | Ahn |
| 2006/0215350 | A1* | 9/2006 | Tonogai .................. H01G 4/30 |
| | | | 361/311 |
| 2010/0039749 | A1 | 2/2010 | Ritter et al. |
| 2012/0019100 | A1* | 1/2012 | Iwanaga ................ H01G 4/012 |
| | | | 336/200 |
| 2012/0019978 | A1* | 1/2012 | Yoshida ................ H01G 4/012 |
| | | | 361/301.4 |
| 2015/0096795 | A1* | 4/2015 | Hong ..................... H01G 2/065 |
| | | | 361/301.4 |
| 2017/0062130 | A1* | 3/2017 | Oh ....................... H01G 4/0085 |
| 2019/0172643 | A1 | 6/2019 | Cha |
| 2019/0172646 | A1 | 6/2019 | Kim et al. |
| 2020/0043656 | A1 | 2/2020 | Kim et al. |
| 2020/0066450 | A1* | 2/2020 | Uenishi .................. H01G 4/012 |

FOREIGN PATENT DOCUMENTS

| | | |
|---|---|---|
| KR | 10-2017-0087665 A | 7/2017 |
| KR | 10-1785013 B1 | 10/2017 |
| KR | 10-2019-0064938 A | 6/2019 |
| KR | 10-2019-0066769 A | 6/2019 |

\* cited by examiner

BROADBAND CAPACITOR

TECHNICAL FIELD

The present disclosure relates to a broadband capacitor, and more particularly, to a broadband capacitor that is used in the construction of a high-speed communication network.

BACKGROUND ART

A conventional broadband capacitor is constructed by stacking a plurality of electrode units each constituted with a main electrode having an extension arm formed on a lateral part on one side of the main electrode and C type electrodes that surround the other side of the main electrode. The conventional broadband capacitor implements a broadband characteristic by increasing capacitance in a way to form primary capacitance through an overlap between the main electrodes and to form secondary capacitance between the C type electrodes and the main electrode.

However, the conventional broadband capacitor has a problem in that it is difficult to change a capacitance value because a range in which the area of the main electrode may be changed is limited due to a side to which the extension arm and the main electrode are connected and the C type electrodes.

DISCLOSURE

Technical Problem

The present disclosure has been proposed in view of the circumstance, and an object of the present disclosure is to provide a broadband capacitor in which floating electrodes are disposed above, below, and at both sides of a stack body in which a plurality of internal electrodes has been stacked.

Technical Solution

In order to accomplish the above object, a broadband capacitor according to an embodiment of the present disclosure includes a dielectric in which a stack body having a plurality of internal electrodes stacked thereon is disposed and which has an upper surface, a lower surface, a first side surface, a second side surface, a third side surface, and a fourth side surface, a first external electrode disposed on the first side surface of the dielectric and extended to the upper surface, lower surface, third side surface, and fourth side surface of the dielectric and disposed thereon, a second external electrode disposed on the second side surface of the dielectric and extended to the upper surface, lower surface, third side surface, and fourth side surface of the dielectric and disposed thereon, a first floating electrode disposed above the stack body, a second floating electrode disposed below the stack body, a third floating electrode disposed at one lateral part of the stack body, and a fourth floating electrode disposed at the other lateral part of the stack body, which faces the one lateral part of the stack body.

The first floating electrode may overlap a part of the first external electrode and a part of the second external electrode disposed on the upper surface of the dielectric. The second floating electrode may overlap a part of the first external electrode and a part of the second external electrode disposed on the lower surface of the dielectric. The third floating electrode may overlap a part of the first external electrode and a part of the second external electrode disposed on the third side surface of the dielectric. The fourth floating electrode may overlap a part of the first external electrode and a part of the second external electrode disposed on the fourth side surface of the dielectric.

The plurality of internal electrodes may include a plurality of first internal electrodes and a plurality of second internal electrodes. The plurality of first internal electrodes and the plurality of second internal electrodes may be alternately disposed. First sides of the plurality of first internal electrodes may be connected to the first external electrode on the first side surface of the dielectric, and second sides of the plurality of first internal electrodes, which face the first sides, may be spaced apart from the second external electrode disposed on the second side surface of the dielectric. First sides of the plurality of second internal electrodes may be connected to the second external electrode on the second side surface of the dielectric, and second sides of the plurality of second internal electrodes, which face the first sides, may be spaced apart from the first external electrode disposed on the first side surface of the dielectric.

The stack body may be disposed in an area surrounded by the first floating electrode, the second floating electrode, the third floating electrode, and the fourth floating electrode.

A first side of the first floating electrode may be connected to a first side of the third floating electrode. A second side of the first floating electrode may be connected to a first side of the fourth floating electrode. A first side of the second floating electrode may be connected to a second side of the third floating electrode. A second side of the second floating electrode may be connected to a second side of the fourth floating electrode.

The first side of the first floating electrode may be connected to the first side of the third floating electrode. A first side of the second floating electrode may be spaced apart from a second side of the third floating electrode. A first side of the fourth floating electrode may be spaced apart from a second side of the first floating electrode. A second side of the second floating electrode may be connected to a second side of the fourth floating electrode.

The first floating electrode and the second floating electrode may be disposed in parallel to the plurality of internal electrodes. The third floating electrode and the fourth floating electrode may be disposed in parallel to a virtual plane orthogonal to the plurality of internal electrodes.

The first floating electrode may be disposed to be adjacent to the upper surface of the dielectric. The second floating electrode may be disposed to be adjacent to the lower surface of the dielectric. The third floating electrode may be disposed to be adjacent to the third side surface of the dielectric. The fourth floating electrode may be disposed to be adjacent to the fourth side surface of the dielectric.

Advantageous Effects

According to the present disclosure, the broadband capacitor has an effect in that it can increase a current loop effect and/or a parasitic capacitance effect, compared to a structure in which electrodes parallel to internal electrodes are disposed on the left and right sides of the internal electrodes, because the floating electrodes disposed perpendicularly to the internal electrodes are disposed on the left and right sides of the internal electrodes.

In other words, a broadband capacitor having the structure in which the electrodes parallel to the internal electrodes are disposed on the left and right sides of the internal electrodes has the leakage of an electric field, etc. because an empty gap is formed between the electrodes (i.e., between layers) parallel to the internal electrodes. In contrast, the broadband capacitor according to an embodiment of the present disclosure has an effect in that it can increase a current loop effect and/or a parasitic capacitance effect, because the floating electrodes disposed perpendicularly to the internal electrodes are disposed on the left and right sides of the internal electrodes and an empty space between the layers is relatively small.

Furthermore, the broadband capacitor has an effect in that it can relatively increase the area of a capacitance part, compared to a structure in which electrodes parallel to internal electrodes are disposed on the left and right sides of the internal electrodes, because the floating electrodes disposed perpendicularly to the internal electrodes are disposed on the left and right sides of the internal electrode and occupy a small space.

Furthermore, the broadband capacitor has an effect in that it can implement a relatively high capacity in the same size by relatively increasing the area of a capacitance part by disposing the floating electrodes disposed perpendicularly to the internal electrodes on the left and right sides of the internal electrode.

Accordingly, the broadband capacitor has constant frequency performance and can also be fabricated with a very small size and a high capacity.

MODE FOR INVENTION

Hereinafter, the most preferred exemplary embodiments of the present disclosure will be described with reference to the accompanying drawings in order to specifically describe the exemplary embodiments so that those skilled in the art to which the present disclosure pertains may easily implement the technical spirit of the present disclosure. First, in adding reference numerals to the components of each drawing, it should be noted that the same components have the same reference numerals as much as possible even if they are displayed in different drawings. Furthermore, in describing the present disclosure, when it is determined that the detailed description of the related well-known configuration or function may obscure the gist of the present disclosure, the detailed description thereof will be omitted.

First, in adding reference numerals to the elements of each drawing, it should be noted that the same elements have the same reference numerals as much as possible even if they are displayed in different drawings.

Furthermore, in describing embodiments of the present disclosure, when it is determined that a detailed description of the related well-known configuration or function may obscure the subject matter of the present disclosure, the detailed description thereof will be omitted.

Figure 1:
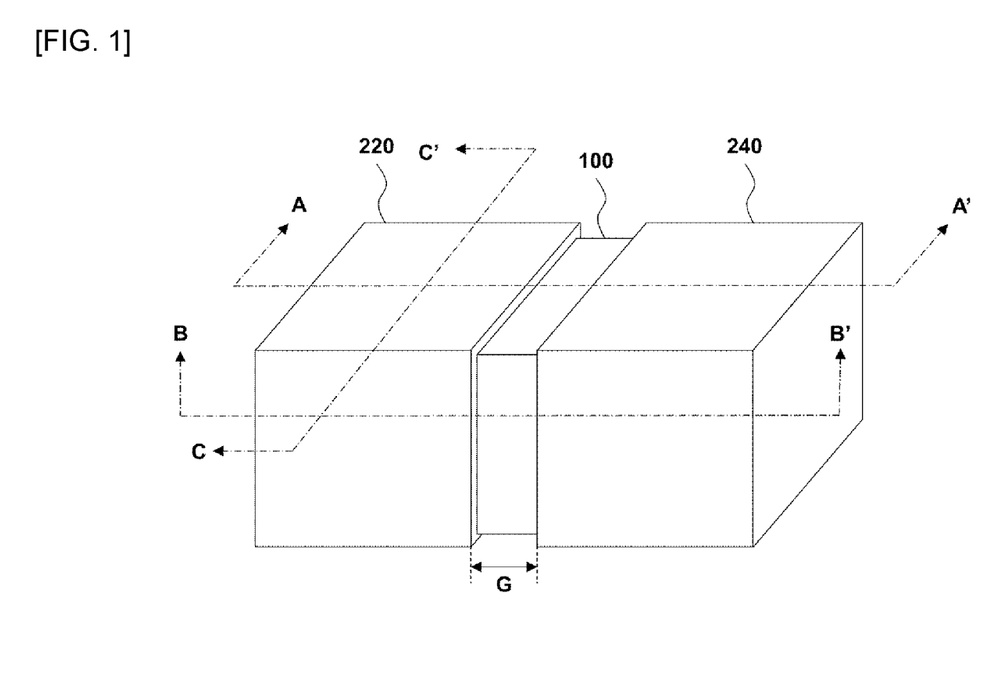
FIG. 1 is a diagram for describing a broadband capacitor according to an embodiment of the present disclosure.
Figure 2:
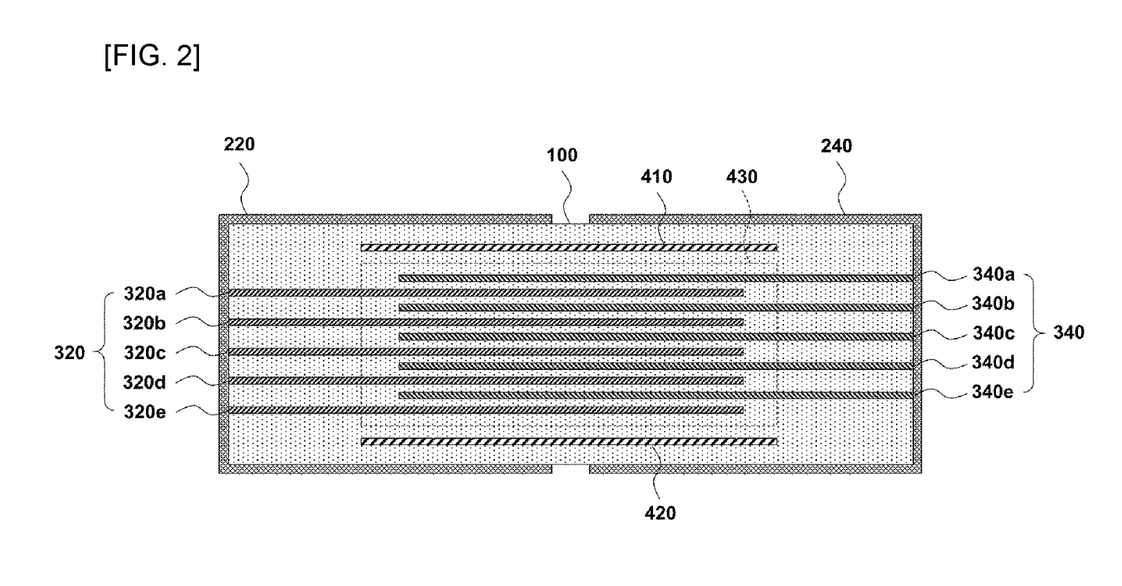
FIG. 2 is a cross-sectional view of the broadband capacitor taken along an arrow A-A' in FIG. 1.
Figure 3:
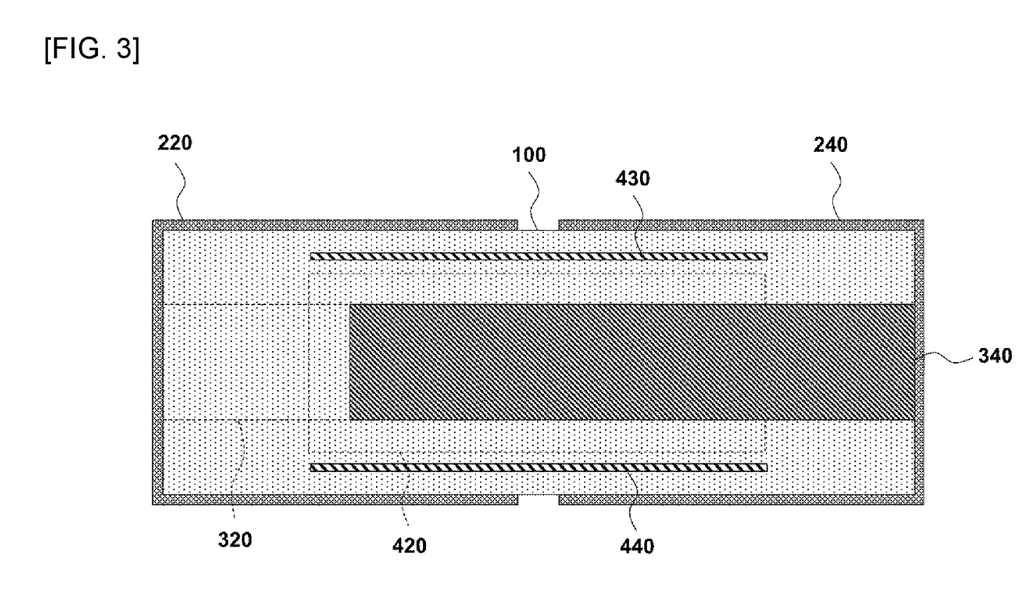
FIG. 3 is a cross-sectional view of the broadband capacitor taken along an arrow B-B' in FIG. 1.

Referring to FIGS. 1 to 3, a broadband capacitor according to an embodiment of the present disclosure includes a dielectric 100, a first external electrode 220, a second external electrode 240, a plurality of first internal electrodes 320, a plurality of second internal electrodes 340, a first floating electrode 410, a second floating electrode 420, a third floating electrode 430, and a fourth floating electrode 440.

The dielectric 100 has an upper surface, a lower surface, a first side surface, a second side surface, a third side surface, and a fourth side surface. In this case, the upper surface faces the lower surface, the first side surface faces the second side surface, and the third side surface faces the fourth side surface. Accordingly, an example is taken in which the dielectric 100 has a rectangular parallelepiped having the upper surface, the lower surface, the first side surface, the second side surface that faces the first side surface, the third side surface, and the fourth side surface that faces the third side surface. In this case, the dielectric 100 may be constituted with a stack body on which a plurality of dielectric sheets having internal electrodes formed thereon has been stacked.

The first external electrode 220 is an electrode that is disposed on the first side surface of the dielectric 100. The first external electrode 220 may be formed by extending in the direction of the second external electrode 240 from the upper surface, lower surface, third side surface, and fourth side surface of the dielectric 100.

The second external electrode 240 is an electrode that is disposed on the second side surface of the dielectric 100. The second external electrode 240 may be formed by extending in the direction of the first external electrode 220 from the upper surface, lower surface, third side surface, and fourth side surface of the dielectric 100.

In this case, the first external electrode 220 and the second external electrode 240 may be spaced apart from each other at a predetermined interval G and formed to face each other on the upper surface, lower surface, third side surface, and fourth side surface of the dielectric 100.

A plurality of internal electrodes is sequentially stacked to constitute the stack body that is disposed within the dielectric 100. The plurality of internal electrodes includes the plurality of first internal electrodes 320 and the plurality of second internal electrodes 340. The plurality of first internal electrodes 320 and the plurality of second internal electrodes 340 are alternately disposed (stacked).

A first side of the plurality of first internal electrodes 320 is connected to the first external electrode 220 on the first side surface of the dielectric 100. A second side of the plurality of first internal electrodes 320, which faces the first side, is spaced apart from the second external electrode 240 that is disposed on the second side surface of the dielectric 100.

The first internal electrode 320 is composed of a sheet-shaped conductor formed in a rectangular shape. The first internal electrode 320 includes the first side connected to the first external electrode 220, the second side that faces the first side, a third side connected to an end of the first side and the second side on one side thereof, and a fourth side that is connected to an end of the first side and the second side on the other side thereof and that faces the third side.

The second internal electrode 340 is composed of a sheet-shaped conductor formed in a rectangular shape. The second internal electrode 340 has a first side connected to the second external electrode 240, a second side that faces the first side, a third side connected to an end of the first side and the second side on one side thereof, and a fourth side that is connected to an end of the first side and the second side on the other side thereof and that faces the third side.

The plurality of first internal electrodes 320 and the plurality of second internal electrodes 340 are alternately stacked. In this case, an example is taken in which a dielectric sheet on which the first internal electrode 320 has been formed and a dielectric sheet on which the second internal electrode 340 has been formed are alternately stacked to form the stack body.

The first side of the plurality of first internal electrodes 320 is connected to the first external electrode 220 on the first side surface of the dielectric 100. The second side of the plurality of first internal electrodes 320, which faces the first side, is spaced apart from the second external electrode 240 that is disposed on the second side surface of the dielectric 100. The first side of the plurality of second internal electrodes 340 is connected to the second external electrode 240 on the second side surface of the dielectric 100. The second side of the plurality of second internal electrodes 340, which faces the first side, is spaced apart from the first external electrode 220 that is disposed on the first side surface of the dielectric 100.

Accordingly, the plurality of first internal electrodes 320 and the plurality of second internal electrodes 340 form an overlap area within the dielectric 100, and forms capacitance in the overlap area.

Meanwhile, the stack body having the plurality of internal electrodes stacked and constructed is disposed within the dielectric 100, and is disposed in an area surrounded by the first floating electrode 410, the second floating electrode 420, the third floating electrode 430, and the fourth floating electrode 440. In this case, the overlap area formed by the plurality of internal electrodes is disposed in the area surrounded by the first floating electrode 410, the second floating electrode 420, the third floating electrode 430, and the fourth floating electrode 440.

The first floating electrode 410 is composed of a sheet-shaped conductor, and is disposed to be adjacent to the upper surface of the dielectric 100. The first floating electrode 410 is disposed above the stack body on which the plurality of internal electrodes has been stacked. The first floating electrode 410 is spaced apart from the internal electrode disposed on the upper surface of the stack body at a predetermined interval, and a dielectric layer is interposed therebetween.

The first floating electrode 410 overlaps the first external electrode 220 and the second external electrode 240. That is, the first floating electrode 410 overlaps a part of the first external electrode 220 disposed on the upper surface of the dielectric 100 and a part of the second external electrode 240 disposed on the upper surface of the dielectric 100. Accordingly, the broadband capacitor forms capacitance between the first external electrode 220 and the second external electrode 240 and the first floating electrode 410.

The first floating electrode 410 is disposed in parallel to the plurality of internal electrodes. That is, the first floating electrode 410 is disposed between an internal electrode disposed at the top, among the plurality of internal electrodes, and the upper surface of the dielectric 100, and may be disposed in parallel to the internal electrode.

Accordingly, the broadband capacitor forms capacitance between the first floating electrode 410 and the internal electrode.

The second floating electrode 420 is composed of a sheet-shaped conductor, and is disposed to be adjacent to the lower surface of the dielectric 100. The second floating electrode 420 is disposed below the stack body on which the plurality of internal electrodes has been stacked. The second floating electrode 420 is spaced apart from the internal electrode disposed on the lower surface of the stack body at a predetermined interval, and a dielectric layer is interposed therebetween.

The second floating electrode 420 overlaps the first external electrode 220 and the second external electrode 240. That is, the second floating electrode 420 overlaps a part of the first external electrode 220 disposed on the lower surface of the dielectric 100 and a part of the second external electrode 240 disposed on the lower surface of the dielectric 100. Accordingly, the broadband capacitor forms capacitance between the first external electrode 220 and the second external electrode 240 and the second floating electrode 420.

The second floating electrode 420 is disposed in parallel to the plurality of internal electrodes. That is, the second floating electrode 420 is disposed between an internal electrode disposed at the bottom, among the plurality of internal electrodes, and the lower surface of the dielectric 100, and may be disposed in parallel to the internal electrode. Accordingly, the broadband capacitor forms capacitance between the second floating electrode 410 and the internal electrode.

The third floating electrode 430 is composed of a sheet-shaped conductor, and is disposed to be adjacent to the third side surface of the dielectric 100. The third floating electrode 430 is disposed at one lateral part of the stack body on which the plurality of internal electrodes has been stacked. The third floating electrode 430 is spaced apart from the third sides of the plurality of internal electrodes at a predetermined interval, and a dielectric layer is interposed therebetween.

The third floating electrode 430 overlaps the first external electrode 220 and the second external electrode 240. That is, the third floating electrode 430 overlaps a part of the first external electrode 220 disposed on the third side surface of the dielectric 100 and a part of the second external electrode 240 disposed on the third side surface of the dielectric 100. Accordingly, the broadband capacitor forms capacitance between the first external electrode 220 and the second external electrode 240 and the third floating electrode 430.

The third floating electrode 430 is disposed in parallel to the third sides of the plurality of internal electrodes (or the third side surface of the dielectric 100). The third floating electrode 430 is disposed between the third sides of the plurality of internal electrodes and the third side surface of the dielectric 100. The third floating electrode 430 may be disposed in parallel to a virtual plane orthogonal to the plurality of internal electrodes (or the stack body). Accordingly, the broadband capacitor forms capacitance between the third floating electrode 430 and the internal electrodes.

The fourth floating electrode 440 is composed of a sheet-shaped conductor, and is disposed to be adjacent to the fourth side surface of the dielectric 100. The fourth floating electrode 440 is disposed at the other lateral part of the stack body on which the plurality of internal electrodes has been stacked. The fourth floating electrode 440 is spaced apart from the fourth sides of the plurality of internal electrodes at a predetermined interval, and a dielectric layer is interposed therebetween.

The fourth floating electrode 440 overlaps the first external electrode 220 and the second external electrode 240. That is, the fourth floating electrode 440 overlaps a part of the first external electrode 220 disposed on the fourth side surface of the dielectric 100 and a part of the second external electrode 240 disposed on the fourth side surface of the dielectric 100. Accordingly, the broadband capacitor forms capacitance between the first external electrode 220 and the second external electrode 240 and the fourth floating electrode 440.

The fourth floating electrode 440 is disposed in parallel to the fourth sides of the plurality of internal electrodes (or the fourth side surface of the dielectric 100). The fourth floating electrode 440 is disposed between the fourth sides of the plurality of internal electrodes and the fourth side surface of the dielectric 100. The fourth floating electrode 440 may be disposed in parallel to a virtual plane orthogonal to the plurality of internal electrodes (or the stack body). Accordingly, the broadband capacitor forms capacitance between the fourth floating electrode 440 and the internal electrodes.

Figure 4:
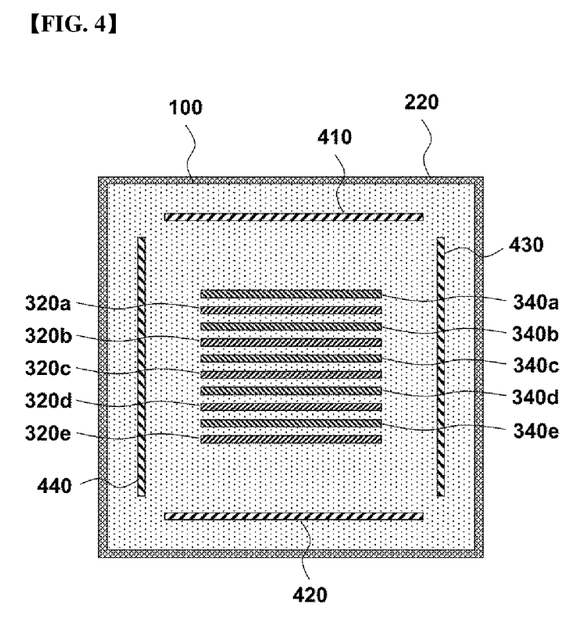
FIG. 4 is a cross-sectional view of the broadband capacitor taken along an arrow C-C' in FIG. 1.

Referring to FIG. 4, the first floating electrode 410 to the fourth floating electrode 440 are spaced apart from one another and disposed. That is, a first side of the first floating electrode 410 is spaced apart from a first side of the third floating electrode 430. A second side of the first floating electrode 410 is spaced apart from a first side of the fourth floating electrode 440. A first side of the second floating electrode 420 is spaced apart from a second side of the third floating electrode 430. A second side of the second floating electrode 420 is spaced apart from a second side of the fourth floating electrode 440.

The third floating electrode and the fourth floating electrode may be implemented through the following process. Hereinafter, the stack body is what the dielectric sheets having the internal electrodes stacked thereon have been stacked.

For example, the third floating electrode and the fourth floating electrode are implemented through a first process of forming a first dielectric layer on the side surface of the stack body through a dielectric printing process or a dielectric sheet bonding process, a second process of forming an electrode on a surface of the first dielectric layer by printing metal on the first dielectric layer, and a third process of forming a second dielectric layer on surfaces of the electrode and the first dielectric layer through a dielectric printing process or a dielectric sheet bonding process.

Furthermore, for example, the third floating electrode and the fourth floating electrode may be implemented through a first process of forming an electrode on a dielectric sheet for a side surface through a printing process, a second process of bonding, to a side surface of the stack body, a dielectric sheet on which the electrode has been formed through a bonding process, and a third process of forming a second dielectric layer on surfaces of the electrode and the dielectric sheet through a dielectric printing process or a dielectric sheet bonding process.

Furthermore, for example, the third floating electrode and the fourth floating electrode may be implemented through a first process of forming an electrode on a dielectric sheet for a side surface through a printing process, a second process of stacking a protection sheet on surfaces of the electrode and the dielectric sheet, and a third process of bonding, to the stack body, the dielectric sheet on which the protection sheet has been stacked. In this case, the protection sheet may be a dielectric sheet.

In this case, the dielectric layer that is printed on or bonded to the side surface of the stack body can prevent a defect in the capacitor which occurs due to a difference between densities by making the densities uniform through a warm isostatic press (WIP) process, etc.

Two or more first floating electrodes 410 to two or more fourth floating electrodes 440 may be connected for the optimization of a manufacturing process condition and frequency characteristics of the capacitor. In this case, two electrodes that are adjacent to each other, among the first floating electrodes 410 to the fourth floating electrodes 440, are connected.

Figure 5:
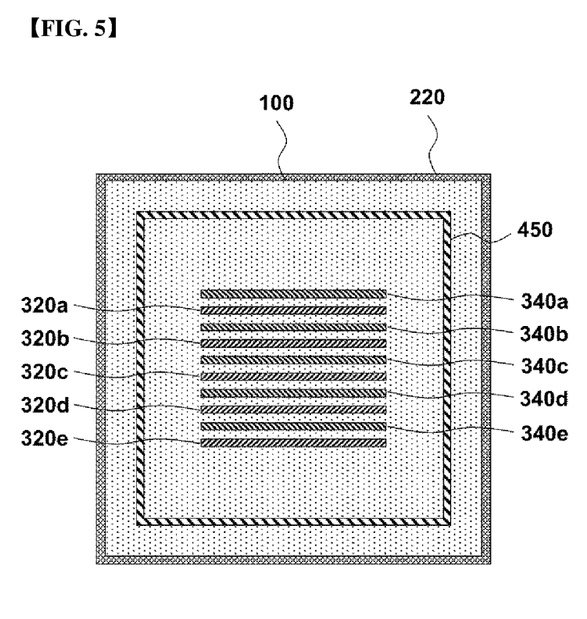
FIGS. 5 to 7 are diagrams for describing a modified example of the broadband capacitor according to an embodiment of the present disclosure.

Referring to FIG. 5, the first floating electrode 410 to the fourth floating electrode 440 may be connected to form a pipe type floating electrode 450 having a rectangular parallelepiped pipe shape.

For example, the first side of the first floating electrode 410 may be connected to the first side of the third floating electrode 430. The second side of the first floating electrode 410 may be connected to the first side of the fourth floating electrode 440. The first side of the second floating electrode 420 may be connected to the second side of the third floating electrode 430. The second side of the second floating electrode 420 may be connected to the second side of the fourth floating electrode 440.

Accordingly, the first floating electrode 410 to the fourth floating electrode 440 form the pipe type floating electrode 450 having a rectangular parallelepiped pipe shape that accommodates the stack body. In this case, a part of the stack body is accommodated in an internal area of the pipe type floating electrode 450, and an overlap area formed by the plurality of internal electrodes is accommodated in the internal area.

Figure 6:
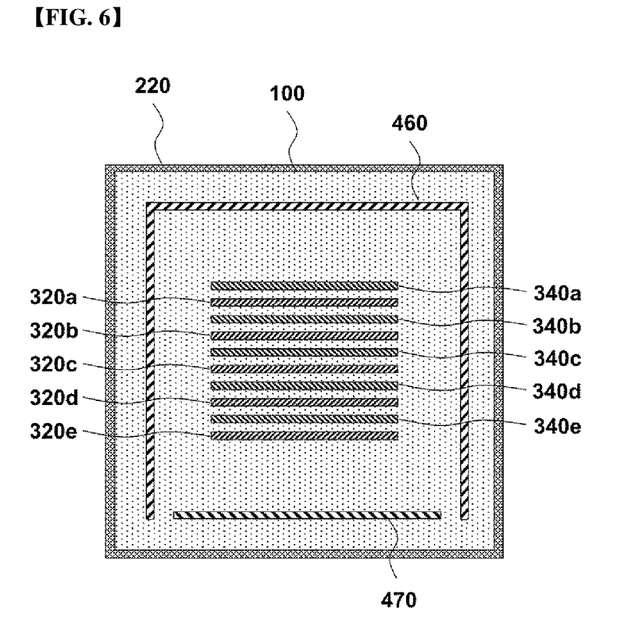

Referring to FIG. 6, the first floating electrode 410 to the fourth floating electrode 440 may form a cover type floating electrode 460 and a sheet type floating electrode 470. That is, three floating electrodes that are adjacent to one another, among the first floating electrode 410 to the fourth floating electrode 440, are connected to form the cover type floating electrode 460 having a cross section of a quadrangular shape one side of which has been opened. In this case, the remaining one floating electrode forms the sheet type floating electrode 470 that corresponds to the opened side of the quadrangular shape.

For example, the first side of the first floating electrode 410 is connected to the first side of the third floating electrode 430. The second side of the first floating electrode 410 is connected to the first side of the fourth floating electrode 440. Accordingly, the first floating electrode 410, the third floating electrode 430, and the fourth floating electrode 440 form the cover type floating electrode 460 having a cross section of a quadrangular shape a side of which in the direction of the second floating electrode 420 has been opened. The second floating electrode 420 is disposed between the second side of the third floating electrode 430 and the second side of the fourth floating electrode 440, and forms a sheet type floating electrode 480 that is spaced apart from the third floating electrode 430 and the fourth floating electrode 440 at a predetermined interval.

Figure 7:
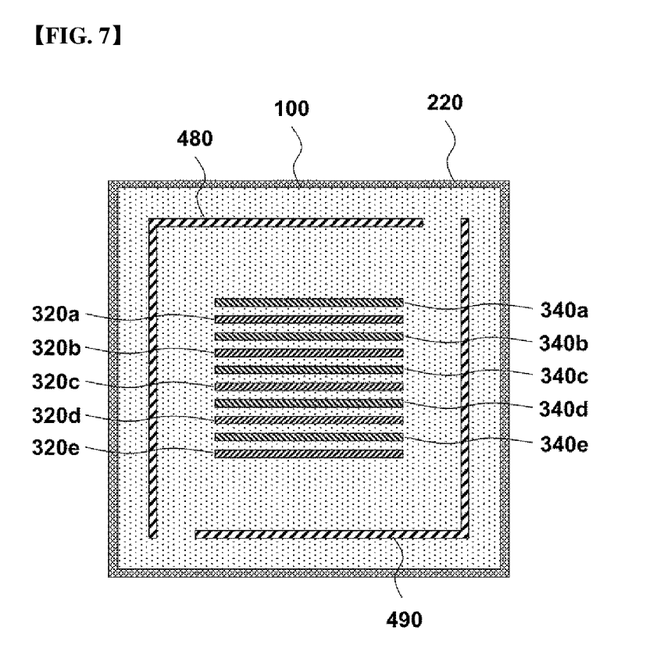

Referring to FIG. 7, two floating electrodes that are adjacent to each other, among the first floating electrode 410 to the fourth floating electrode 440, are connected to form two bent-shaped floating electrodes that are spaced apart from each other. In this case, the first floating electrode 410 to the fourth floating electrode 440 may form a first bent-shaped floating electrode 480 and a second bent-shaped floating electrode 490 that are spaced apart from each other.

For example, the first side of the first floating electrode 410 is connected to the first side of the third floating electrode 430, thereby forming the first bent-shaped floating electrode 480. The second side of the second floating electrode 420 is connected to the second side of the fourth floating electrode 440, thereby forming the second bent-shaped floating electrode 490.

The first side of the second floating electrode 420 is spaced apart from the second side of the third floating electrode 430. The first side of the fourth floating electrode 440 is spaced apart from the second side of the first floating electrode 410. Accordingly, the first bent-shaped floating electrode 480 and the second bent-shaped floating electrode 490 are spaced apart from each other, and form a rectangular parallelepiped pipe in which a gap between a first plate and a fourth plate and a gap between a second plate and a third plate are opened.

As described above, although the preferred embodiments according to the present disclosure have been described, it is understood that changes may be made in various forms, and those skilled in the art may practice various changed examples and modified examples without departing from the claims of the present disclosure.

The invention claimed is:

1. A broadband capacitor comprising:
a dielectric in which a stack body having a plurality of internal electrodes stacked thereon is disposed and which has an upper surface, a lower surface, a first side surface, a second side surface, a third side surface, and a fourth side surface;
a first external electrode disposed on the first side surface of the dielectric and extended to the upper surface, lower surface, third side surface, and fourth side surface of the dielectric and disposed thereon;
a second external electrode disposed on the second side surface of the dielectric and extended to the upper surface, lower surface, third side surface, and fourth side surface of the dielectric and disposed thereon;
a first floating electrode disposed above the stack body;
a second floating electrode disposed below the stack body;
a third floating electrode disposed at one lateral part of the stack body; and
a fourth floating electrode disposed at the other lateral part of the stack body, which faces the one lateral part of the stack body,
wherein a first side of the first floating electrode is connected to a first side of the third floating electrode,
a first side of the second floating electrode is spaced apart from a second side of the third floating electrode,
a first side of the fourth floating electrode is spaced apart from a second side of the first floating electrode, and
a second side of the second floating electrode is connected to a second side of the fourth floating electrode.

2. The broadband capacitor of claim 1, wherein:
the first floating electrode overlaps a part of the first external electrode and a part of the second external electrode disposed on the upper surface of the dielectric, and
the second floating electrode overlaps a part of the first external electrode and a part of the second external electrode disposed on the lower surface of the dielectric.

3. The broadband capacitor of claim 1, wherein:
the third floating electrode overlaps a part of the first external electrode and a part of the second external electrode disposed on the third side surface of the dielectric, and
the fourth floating electrode overlaps a part of the first external electrode and a part of the second external electrode disposed on the fourth side surface of the dielectric.

4. The broadband capacitor of claim 1, wherein:
the plurality of internal electrodes comprises a plurality of first internal electrodes and a plurality of second internal electrodes, and
the plurality of first internal electrodes and the plurality of second internal electrodes are alternately disposed.

5. The broadband capacitor of claim 4, wherein:
first sides of the plurality of first internal electrodes are connected to the first external electrode on the first side surface of the dielectric, and second sides of the plurality of first internal electrodes, which face the first sides, are spaced apart from the second external electrode disposed on the second side surface of the dielectric, and
first sides of the plurality of second internal electrodes are connected to the second external electrode on the second side surface of the dielectric, and second sides of the plurality of second internal electrodes, which face the first sides, are spaced apart from the first external electrode disposed on the first side surface of the dielectric.

6. The broadband capacitor of claim 1, wherein the stack body is disposed in an area surrounded by the first floating electrode, the second floating electrode, the third floating electrode, and the fourth floating electrode.

7. The broadband capacitor of claim 1, wherein the first floating electrode and the second floating electrode are disposed in parallel to the plurality of internal electrodes.

8. The broadband capacitor of claim 1, wherein the third floating electrode and the fourth floating electrode are disposed in parallel to a virtual plane orthogonal to the plurality of internal electrodes.

9. The broadband capacitor of claim 1, wherein:
the first floating electrode is disposed to be adjacent to the upper surface of the dielectric, and
the second floating electrode is disposed to be adjacent to the lower surface of the dielectric.

10. The broadband capacitor of claim 1, wherein:
the third floating electrode is disposed to be adjacent to the third side surface of the dielectric, and
the fourth floating electrode is disposed to be adjacent to the fourth side surface of the dielectric.

* * * * *